INVENTORS.
LAMBERT HANER
& ROBERT H. SAYRE
BY
RICHARD MAC CUTCHEON
ATTORNEY.

Nov. 24, 1970

L. HANER ET AL 3,543,116

DIGITAL VARIABLE SPEED CONTROLLER COMPARING A TACHOMETER
PULSE SOURCE WITH A REFERENCE

Filed May 1, 1968

INVENTORS.
LAMBERT HANER
& ROBERT H. SAYRE
BY
RICHARD MAC CUTCHEON

ATTORNEY.

United States Patent Office 3,543,116
Patented Nov. 24, 1970

3,543,116
DIGITAL VARIABLE SPEED CONTROLLER COMPARING A TACHOMETER PULSE SOURCE WITH A REFERENCE
Lambert Haner, Rocky River, and Robert H. Sayre, Orange Village, Ohio, assignors to Avtron Manufacturing, Inc., Cleveland, Ohio, a corporation of Ohio
Filed May 1, 1968, Ser. No. 725,798
Int. Cl. H02p 7/42
U.S. Cl. 318—318　　　　　　　　　　2 Claims

ABSTRACT OF THE DISCLOSURE

A digital speed controller with an analog output usable as a retrofit for an existing motor rheostat, engine governor, or the like, has a manually calibrated source of timing pulses, a tachometer generator source of controlled pulses, a gain factor selector for affecting the pulse rate from both sources, a digital comparator for comparing the pulse rates delivered by the selector, and a reversible control motor energized by the digital comparator for automatic operation. Manual control is possible, either with pushbuttons or by turning the control motor, by hand, when de-energized.

BACKGROUND OF THE INVENTION

The present invention relates to motor speed control and has particular significance in connection with a digital control means which provides automatic long term speed regulation for either an existing or a new drive system together with (e.g., short term) manual over-ride.

Heretofore, many types of automatic motor speed control have been known. To avoid temperature drift and achieve greater accuracy, solid state digital equipment for motor speed control has been known but it has been expensive and, since it characteristically provides a staircase or other variant voltage output, not suited to adaptation to existing (rotary knob or other manual control) installations.

It is an object of the present invention to provide simple and inexpensive means for overcoming the above mentioned difficulties.

BRIEF DESCRIPTION OF THE DRAWING

Other objects and advantages will become apparent and the invention may be better understood from consideration of the following description taken in connection with the accompanying drawings, in which.

DESCRIPTION OF PREFERRED EMBODIMENT

Figure 1:
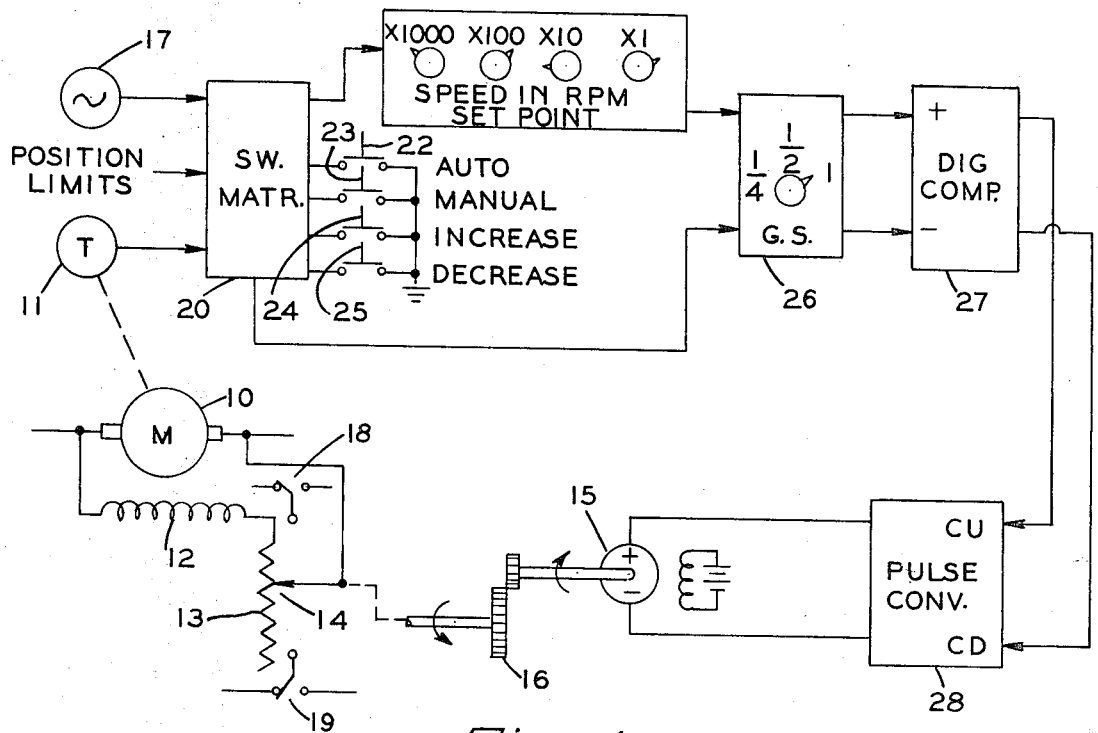
FIG. 1 is a one line and block diagram of digital speed control apparatus embodying the invention in one form.

Referring to FIG. 1, a main motor 10 is assumed driving associate process line equipment (not shown). For the present invention motor 10 also drives a tachometer generator 11 which provides a pulse output of, for example, 60 pulses per revolution. Main motor 10 has a field winding 12 in series with a potentiometer 13 having an adjustable tap 14 which according to the invention is driven by a stepping motor 15, e.g., through a 4/1 ratio gear reducer 16.

The stepping motor driven potentiometer 13–14 might operate to change field or armature current of either a motor or a generator. But whether the overall system is Ward-Leonard, or other, forms no part of the present invention, and so field weakening is shown for main motor speed control merely as an example.

The potentiometer 13–14, which may be assumed of helipot type and having 10 turns, can be used to replace an existing manually operable speed set point potentiometer by simply reconnecting the wires. 13–14 may itself be manually operable (by switching off the power to stepping motor 15). For automatic operation, the pulse generator 11 provides pulses proportional to speed of main motor 10. These pulses, as well as timing pulses from a crystal oscillator 17, and potentiometer tap 14 position limit signals, as from limit switches 18, 19, are fed to a switching matrix 20, it being understood that in the drawing the various electrical connection lines schematically represent signal flow lines rather than any particular number of wires and that plug-in connectors both at the mechanical equipment (11, 18, 19, 15) and at the back of the controller equipment cabinet (21, see FIG. 2) may be preferred though they are not shown.

Figure 2:
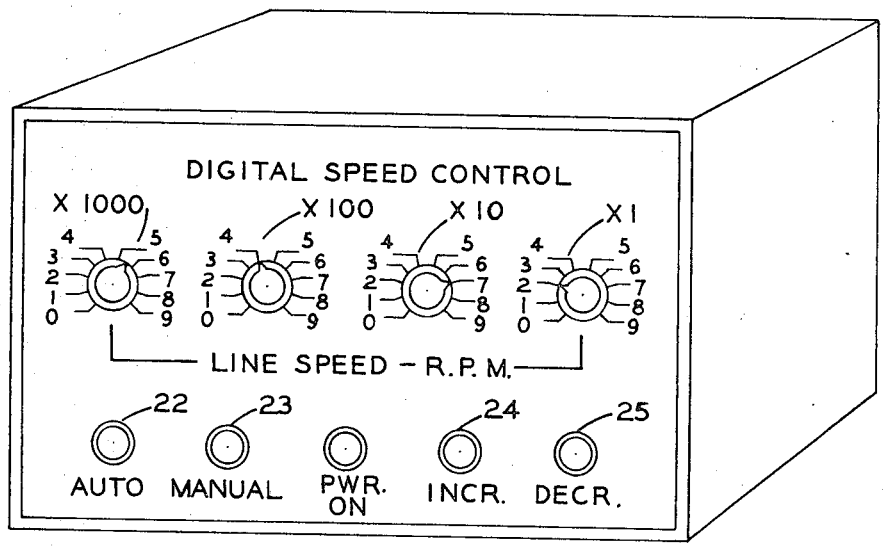
FIG. 2 illustrates a cabinet for suitably enclosing the electronic equipment.

As seen in FIGS. 1 and 2 a pushbutton 22 provides the automatic mode of control at which the motor driven potentiometer is automatically positioned to bring the speed of the drive system to a set point. The desired set point speed is selected by means of four rotary switches identified as X 1000, X 100, etc. and this provides a speed adjustment range of 0 to 9,999 r.p.m. to the nearest 1 r.p.m. For a manual mode of control (really, "semi-manual" as contrasted with moving tap 14 by hand, as already described), pushbutton 23 is depressed, and the operator may then either increase or decrease the potentiometer setting by pressing the corresponding increase (24) or decrease (25) pushbutton located on the front panel.

For adjustment internally of the equipment cabinet 21 (because the relevant parameters will probably not change for any particular installation) is a "Gain Selector" device 26 which selectively divides to change pulse rate (e.g., multiplying by ¼, or by ½, or by 1, as indicated). Device 26 may comprise pairs of flip-flops selectively arrangeable in tandem, as seen in FIG. 3.

Suppose, as indicated, a pulse signal from the timing generator 17, as calibrated by the set point selectors (X 1000–X 1) represents a plus condition, higher than the rate of pulse signal from the tachometer 11. The two signals are compared (subtracted) in a digital comparator 27 to afford a Count Up signal ($f_{17}-f_T$) to a pulse converter 28. If the situation is reversed ($f_T>f_{17}$) the comparator 27 provides a Count Down signal ($f_T-f_{17}$) to the pulse converter. In either event the pulse converter properly amplifies, polarizes and shapes the difference pulse to properly energize the stepping motor 15 which then moves the potentiometer tap to correct the condition.

Figure 3:
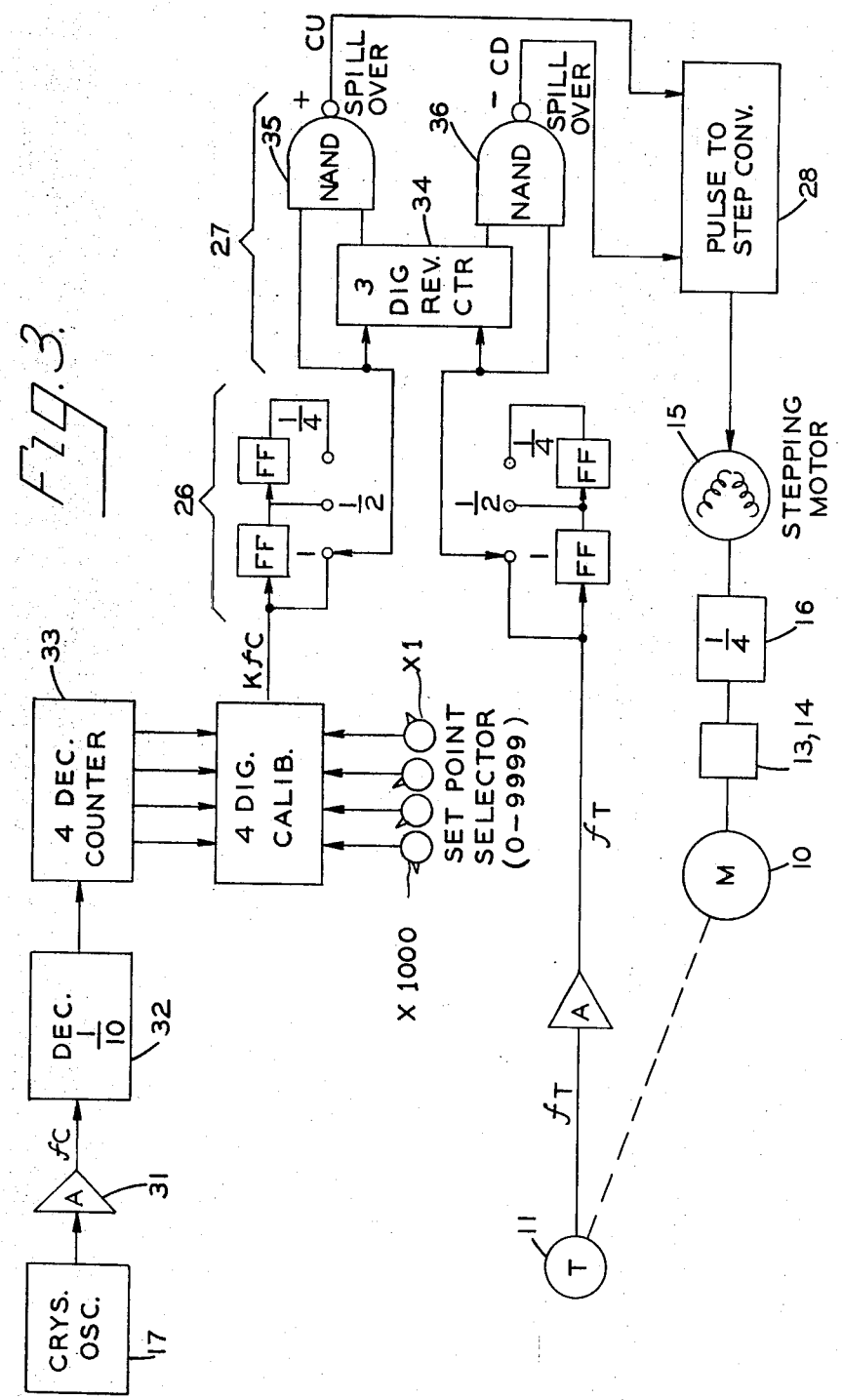
FIG. 3 is a schematic and block diagram of suitable circuitry for the electronic portion of the FIG. 1 or FIG. 2 apparatus.

FIG. 3 includes ofttimes desirable options such as an amplifier 31 for the oscillator (17) followed by a decade counter 32 which divides the calibrating pulse frequency ($f_c$) by 10. Next, the resultant timing signal ($\frac{1}{10} f_c$) is taken to a four decade counter 33 whose actual count (before providing reset and an output signal, $Kf_c$) is determined by the settings of the rotary switches X 1000–X 1.

A signal $f_T$, developed by the pulse generating tachometer 11, and thus proportional to process speed, is along with $Kf_c$, taken to the gain selector 26 circuitry and then to the digital comparator 27.

Many forms of digital comparators are available (see, for example, that described in connection with FIG. 4 of copending application of Haner and Sarver, Ser. No.

655,171, filed July 21, 1967), but for the present application we prefer a simple 3 digit reversible counter 34 (e.g., three flip-flops) that will, for example, count 0, 1, 2, 3 and then count no further (until reversed) to selectively feed either of a pair of NAND gates 35, 36 and thus provide a positive spill over (Count Up) or a negative spill over (Count Down) to a "pulse to step converter" (28) which may provide all of amplification, shaping and logic for stepper direction. Finally (unless $Kf=F_T$) a signal is taken to the stepping motor 15 which, like the pulse to step converter 28, may be of the 1000 steps/sec. precision type as available under the trademark "Slo-Syn" from Superior Electric Co.

Figure 4:
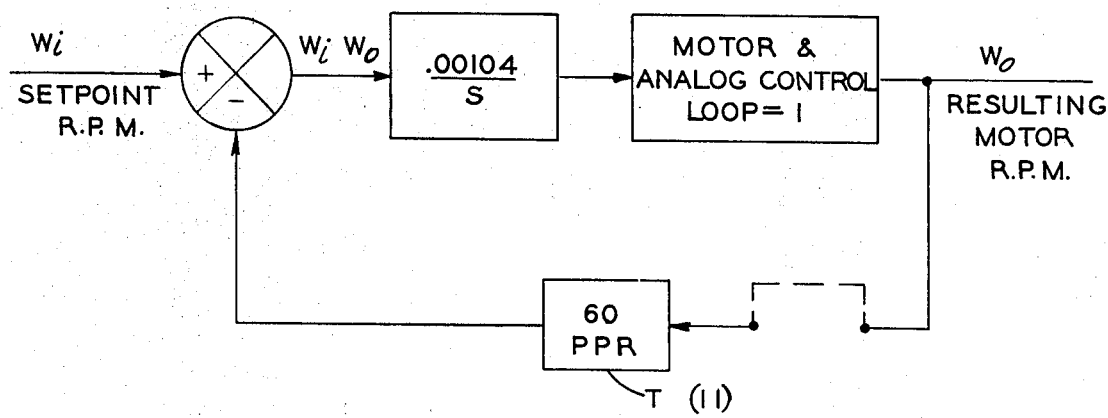
FIG. 4 is a simplified block diagram of the control loop.

FIG. 4 is a block diagram of the control loop. Were the loop open (as shown by the dashed lines), the open loop transfer function can be derived, from a number of factors.

Where:

$W_i$=Angular Velocity, or r.p.m. change "in"
$W_o$=Angular Velocity, or r.p.m. change "out"
S is a Laplace transform function, or more simply, the integral of a step (e.g., above a certain set point) from time 0 to time $t$ and $1/10$ correction takes place in decade 32 (see FIG. 3), so that $1/10\ W_i$ is fed to 60 PPR motor 11,
and (per particular parameters used) the stepping motor 15 rotates 1 revolution per 200 pulses,
and there is a $1/4$ reduction in the gear reducer 16,
and the speed set potentiometer 13 represents 500 r.p.m. change of main motor speed per helipot turn (revolution)

$$W_i/W_o = 1/S \times 1/10 \times 1/60 \times 1/4 \times \frac{1\ \text{Rev.}}{200\ \text{Pulses}}$$

$$\times \frac{500\ \text{RPM}}{1\ \text{Rev.}} = \frac{.00104}{S}$$

An advantage of apparatus according to the invention is that it provides both digital equipment advantages and analog output convenience (e.g., for applying to existing installations). But for the purpose of analyzing the effect of the digital equipment on the total control loop it can be assumed that the transfer function of the analog control loop (helipot 13, 14, and main motor 10, 12) is equal to unity, which assumption will be valid for the case of small error deviations, and also because the analog controller response is faster than that of the digital equipment.

Upon closing the loop and solving for the error function $(W_1-W_o)$ with the set point RPM in the form of a step function $(W_1)$:

$$W_1 = 1/S$$

$$W_1 - W_o / W_1 = \frac{S}{S + 60 x .00104}$$

$$(W_1 - W_o) S / 1 = \frac{S}{S + .0624}$$

$$W_1 - W_o = \frac{1}{S + .0624}$$

$$W_1(t) - W_o(t) = e^{-.06 t}$$

With the loop gain factors used above, the time constant of the system is 16 seconds, assuming the gain selector 26 is on "1." But by manipulating G.S. 26, there are adjustments such that the time constant of the closed loop system can be increased to 32 seconds or to 64 seconds which will slow down the response of the overall control loop.

Figure 5:
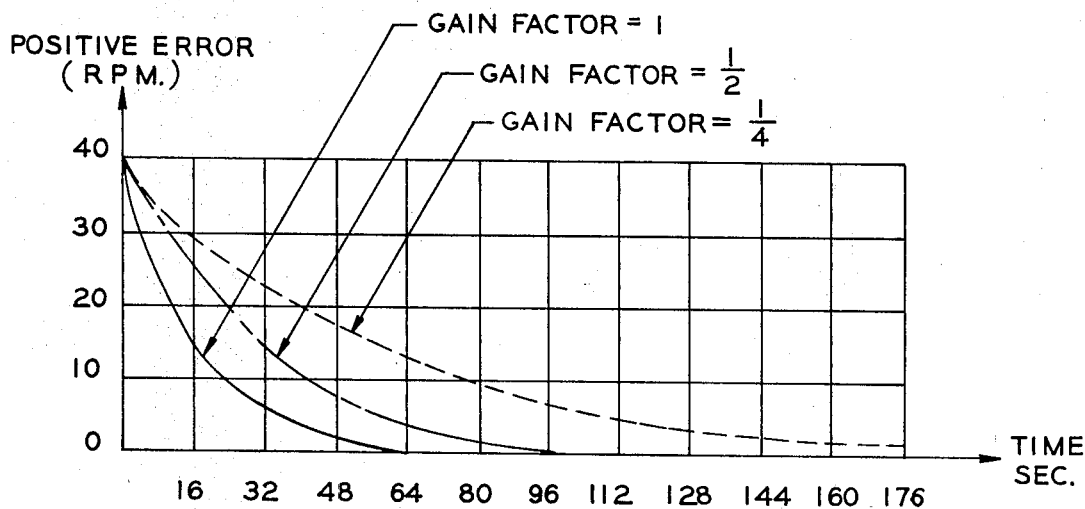
FIG. 5 is a graphical illustration showing response of the system when error signal is plotted as a function of time.

FIG. 5 illustrates typical dynamic response for such a control system. It is assumed that main motor and tachometer are to operate at 4,000 r.p.m. and that an existing error signal corresponds to 40 r.p.m. above the set point of 4,000 r.p.m. FIG. 5 then results from plots of error signal as a function of time to give three curves, one for each of the three settings of Gain Selector 26. It should be noted that, at least for the "1" and "½" gain factor situations, the control operates in a manner to integrate the steady state error to zero. This means that the long term average of the error signal is ideally equal to zero even though the digital control might be considered comparatively slow or unable to respond for short term disturbances (but the prior art couldn't either).

There is thus provided a device of the character described capable of meeting the object above set forth. While we have illustrated and described particular embodiments, various modifications may obviously be made without departing from the true spirit and scope of the invention and its equivalents.

We claim:

1. A digital speed controller having a substantially analog output for applying to a main motor whose speed is to be controlled, said device having:
   an oscillator source of timing pulses,
   a tachometer source of pulses the rate of which varies with the speed of said main motor,
   a set point selector and calibrator operatively connected with one of said sources to provide a manually calibrated output of pulses,
   a digital comparator fed from said selector and calibrator and also fed from the other one of the oscillator and tachometer sources, said digital comparator having a pair of pulse signal output lines alternatively operative, one to provide pulse output from the comparator for the case of positive frequency difference spill over, the other to provide pulse output from the comparator for the case of negative frequency difference spillover,
   a pulse shaper connected to be fed from said comparator, and
   a control motor means connected to be fed from said pulse shaper and for operatively affecting the speed of the main motor.

2. Digital apparatus for controlling the ratio of two pulse frequencies by manual set point adjustment means which calibrates one of them and by electro-mechanical means which varies one of them, said apparatus comprising:
   means for producing a first pulse train,
   means for producing a second pulse train,
   a set point selector and calibrator means connected in one of the pulse trains for varying the rate thereof,
   a gain selector means connected to simultaneously vary the rates of the two pulse trains in like proportion according to predetermined setting whereby to simultaneously affect gain factor and time of response of the system,
   a digital comparator means which comprises a reversible counter and associate logic gates energizable from the pulse trains as calibrated and gain selected, for providing outputs respectively representing polarity of the difference, if any, between the pulse frequencies of the respective inputs,
   a pulse to step converter connected to be controlled by the digital comparator, and
   an electro-mechanical device means connected to the output of the pulse to step converter and for varying the frequency of one of said pulse train producing means.

References Cited

UNITED STATES PATENTS

| | | | |
|---|---|---|---|
| 2,932,778 | 4/1960 | Curtis | 318—318 X |
| 3,110,853 | 11/1963 | Jones | 318—318 X |
| 3,368,134 | 2/1968 | Mead | 318—310 X |
| 3,418,547 | 12/1968 | Dudler | 318—448 X |

ORIS L. RADER, Primary Examiner

A. G. COLLINS, Assistant Examiner